C. A. CAMBAY.
CHANGE SPEED DEVICE.
APPLICATION FILED APR. 12, 1920.

1,373,715.

Patented Apr. 5, 1921.
3 SHEETS—SHEET 1.

Inventor
Charles Amédée Cambay,
By [signature]
Atty.

C. A. CAMBAY.
CHANGE SPEED DEVICE.
APPLICATION FILED APR. 12, 1920.

1,373,715.

Patented Apr. 5, 1921.
3 SHEETS—SHEET 2.

Inventor
Charles Amédée Cambay,
By [signature]
Atty.

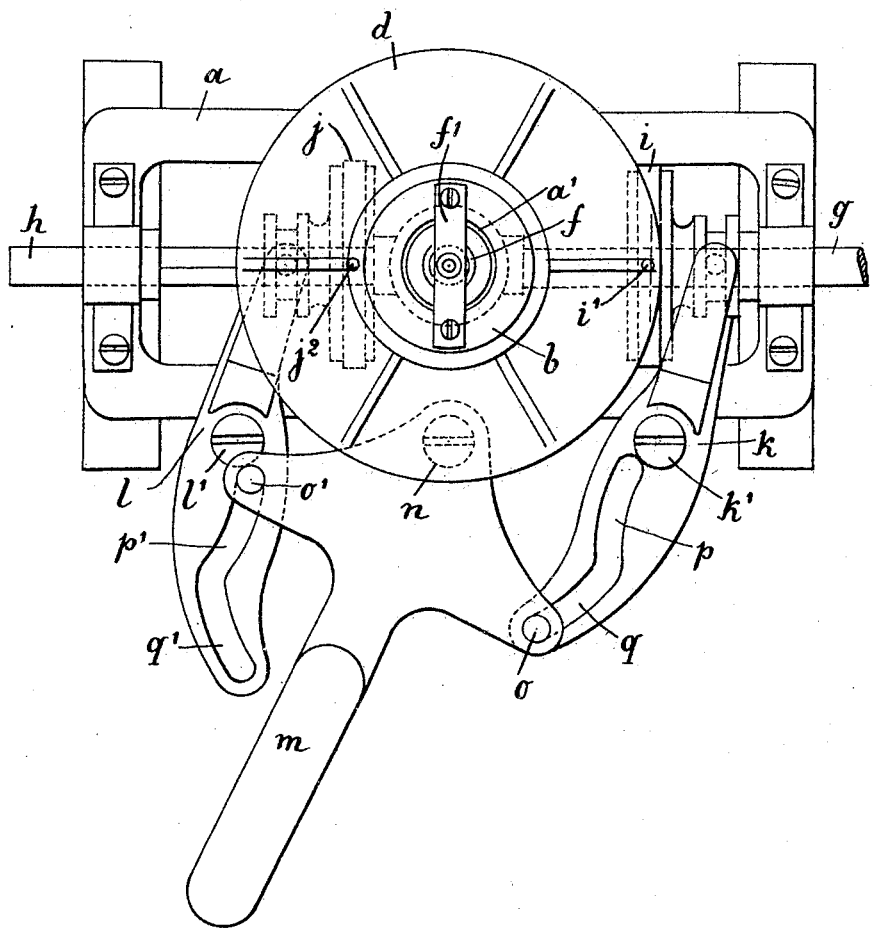

UNITED STATES PATENT OFFICE.

CHARLES AMÉDÉE CAMBAY, OF PARIS, FRANCE, ASSIGNOR TO ANTOINE HENRI THEOPHILE BONNET AND JAMES TIBURCE FELIX CONTI, OF PARIS, FRANCE.

CHANGE-SPEED DEVICE.

1,373,715. Specification of Letters Patent. Patented Apr. 5, 1921.

Application filed April 12, 1920. Serial No. 373,362.

*To all whom it may concern:*

Be it known that I, CHARLES AMÉDÉE CAMBAY, citizen of the Republic of France, residing at Paris, France, 56 Rue La Bruyére, have invented certain new and useful Improvements in Change-Speed Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a change speed device which makes use of friction plates under new conditions of operating.

In the change speed devices with friction plates which have been hitherto employed, these plates are generally utilized as driving or receiving members, and consequently the driving shaft and the secondary or receiving shaft are disposed at an angle of 90 degrees. This arrangement possesses numerous disadvantages and more particularly the following:

1. These two shafts, under the pressure which maintains the contact between the roller and the plate, are submitted to a bending strain which acts upon the bearings of the shafts in such a manner as to cause a resisting torque which reduces the mechanical efficiency.

2. The pressure which serves to maintain the contact between the roller and the plate is constant when this plate is provided with a plane friction surface, regardless of the distance between this roller and the center of the plate; now, in the case of a driving friction roller, the pressure should be greater as the roller is situated nearer the center of the plate. To this end, a plate having a somewhat conical surface is sometimes employed in practice, but this type of plate has a drawback due to the fact that it occasions the rapid wear of the friction roller.

3. In actual practice the maximum and minimum difference of speed at the receiving end is always at a low value compared to what is generally supposed since the friction roller cannot be brought nearer the center of the plate than a certain limit, for owing to the fact that this roller is necessarily relatively wide, its two edges are respectively in contact with two points of the plate located at different distances from the center of this latter and consequently operating at different speeds, the ratio of these speeds being greater as the roller is brought nearer the center of the plate; this gives rise to a certain amount of slipping at the surface which causes the roller to wear out rapidly. Experience shows that this roller should never be brought nearer than one third the radius of the plate.

The device which forms the subject of the present invention is intended to overcome these various drawbacks by increasing the range of the speed variations to a considerable degree.

The present device is characterized by the following combination:

*a.* Two friction rollers keyed respectively upon the driving and the receiving shafts and slidable in the direction of the axis of these shafts.

*b.* Two intermediate friction plates situated opposite each other and mounted loose on their supports; being drawn in the direction of their axis by a retractile force which tends to bring them nearer together, in such manner as to cause them to bear at two opposite points upon each of the two rollers respectively, the latter being thus held pressed between these plates.

Moreover, in the present device the rollers are never brought nearer to the axis of the friction plates than a certain limiting point, whose distance from the axis should not be less than about one-third of the radius of these plates as has been already stated.

Owing to this combination, the present device presents the following principal advantages:

1. The adhesion is twice as great as for the ordinary change speed gear of the friction plate type.

2. The two plates as well as the roller are always in equilibrium, so that there is occasioned no reaction upon the bearings which can be of such nature as to reduce the mechanical efficiency; the entire torque is transmitted to the receiving shaft since the elastic mounting of the two plates will act to prevent all pressure or friction upon the bearings of such nature as to absorb a part of the energy to be transmitted.

3. The pressure exerted by the plates upon the rollers is in all cases automatically proportional to the effort transmitted or to be transmitted.

4. By reason of the movement of the two rollers along their respective driving and receiving shafts, the difference between the maximum and minimum speeds which can be transmitted will now become quite considerable, and in all cases will be equal to the square of the speed difference obtained by the usual methods for a given distance between the roller and the center of the plate.

5. The amount of wear of the rollers and plates is now reduced to a minimum, since all slipping is reduced by reason of the fact that the two rollers are never brought in proximity to the axis of these plates.

6. A high mechanical efficiency will be obtained, as well as a simplified construction, and the device will be able to transmit a considerably greater amount of power.

The accompanying drawings show by way of example an embodiment of the present system of change speed gear.

Figs. 4 and 5 represent the apparatus 1 in plan view with the rollers situated in the positions corresponding respectively to the minimum and the maximum speeds.

Figure 1:
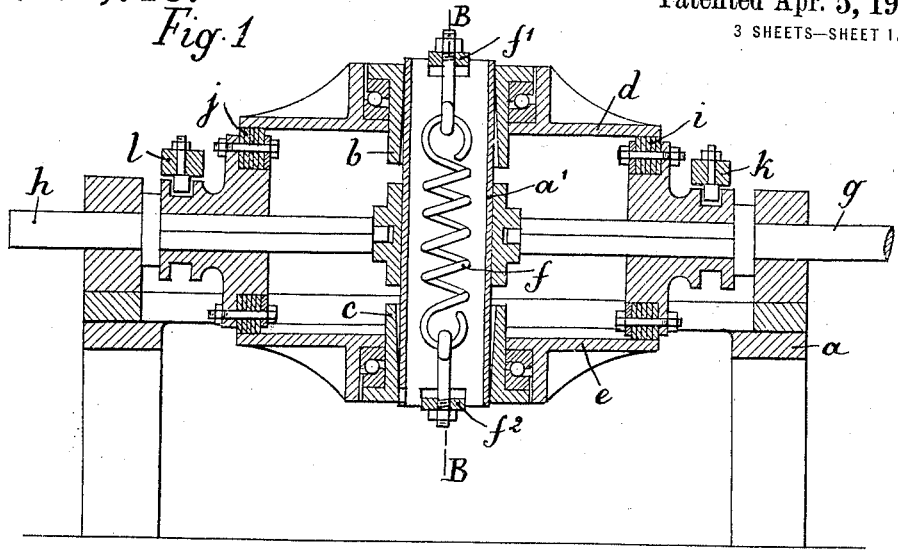
Figure 1 is a vertical longitudinal section along the line A—A of Fig. 2.

As represented in the drawings, the present change speed device is constituted in the following manner:

The entire device is supported upon a frame or body $a$ provided with a tubular member or fixed column $a^1$; upon this latter are arranged to slide two sleeves $b$, $c$, having rotating thereon through the medium of ball bearings two friction disks or plates $d$, $e$; these two plates are drawn together in a constant manner by means of a retractile spring $f$ disposed within the tubular member $a^1$. This spring is attached at the ends to two bars $f^1 f^2$ engaged in two slots formed at the ends of the tubular member $a^1$; these bars are fixed to the sleeves $b$ $c$ and thus prevent any rotary movement of the latter.

In order that the plates and the rollers shall remain constantly in contact regardless of the amount of wear of these latter, the internal surfaces of the sleeves $b$ $c$ are given a suitable elliptical shape as indicated in Fig. 1.

The main frame $a$ and the tubular member $a^1$ carry bearings and brasses in which are mounted the driving shaft $g$ and the receiving shaft $h$ which are disposed along a common axis; these two shafts carry respectively the two friction rollers $i$ $j$ mounted slidably upon the shafts while participating in the rotary movement of the latter and to this effect these shafts have a square section upon a portion of their length.

The two friction plates $d$ $e$ which are drawn together by the action of their retractile spring $f$, hold the two rollers $i$ $j$ pressed between them in such manner that each of these latter is in contact with the two plates at diametrically opposite points. By reason of their spring mounting and their motion along the tubular member $a^1$, these plates constantly exert a pressure upon the rollers which is in all cases exactly proportional to the torque ratio between the shafts to be transmitted.

Moreover, the efforts exerted by these two plates upon the rollers will always be in equilibrium, and under these conditions no mechanical reaction will be produced upon the stationary parts of the apparatus of such character as to absorb a portion of the energy under transmission.

On the other hand, since each of the rollers has two points of contact with the intermediate plates, it can transmit or receive a double effort.

In order to provide for very wide variations of speed, the two rollers $i$ $j$ can be displaced between the two intermediate plates $d$ $e$ along the driving and receiving shafts $g$, $h$, and can thus be made to occupy any position comprised between the two end positions $i^1 j^1$ and $i^2 j^2$; in the positions $i^1 j^1$ the points of contact of the rollers with the plates are located at the periphery of these latter, but on the contrary in the positions $i^2 j^2$ these points of contact are now brought in proximity to the axis of rotation of the plate at a distance representing about one third of the radius of these plates.

Figure 4:
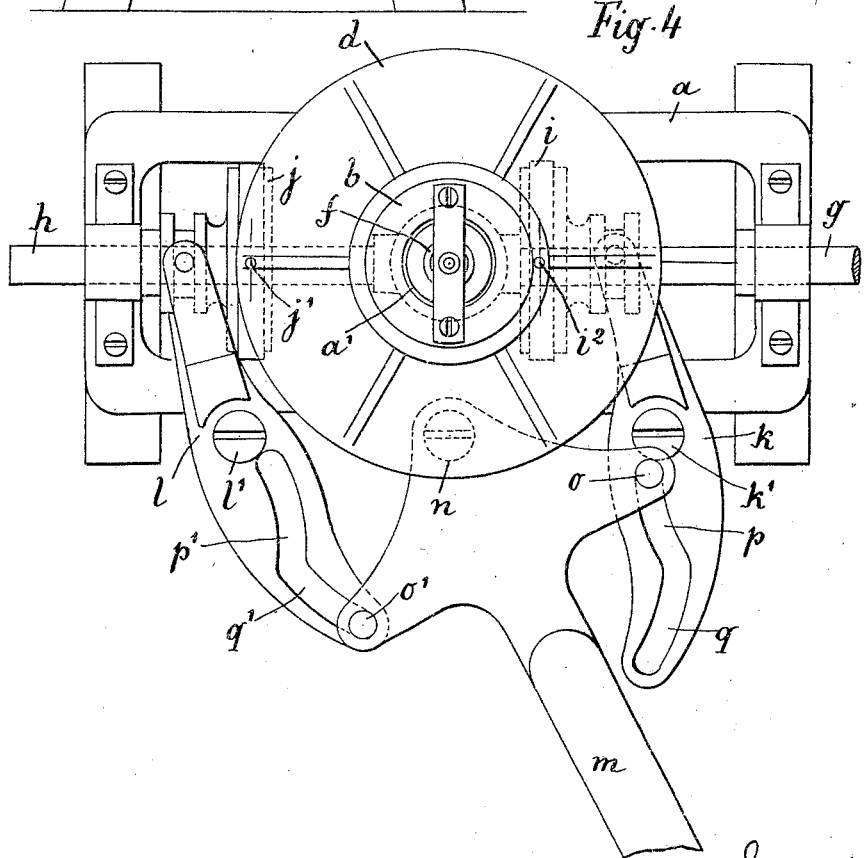

If the receiving roller is maintained in the position $j^1$ and if the driving roller is displaced from the position $i^1$ to the position $i^2$ (Figs. 2 and 4), the speed transmitted by the plates to the receiving roller will increase in the ratio of 1 to 3, and consequently if the driving shaft rotates at a speed of 300 revolutions per minute the receiving shaft will be driven at a rate varying from 300 to 900 revolutions.

On the contrary, if the driving roller is maintained in the position $i^1$, and if the receiving roller is displaced from the position $j^1$ to the position $j^2$ (Figs. 2 and 5) the speed transmitted by the plates to the receiving roller will decrease in the ratio of 3 to 1; consequently, if the driving shaft rotates as just stated at a speed of 300 revolutions per minute, the speed conferred upon the receiving shaft may vary from 300 to 100 revolutions.

The present system of transmission thus makes use of a suitable displacement of the driving and receiving rollers $i$ and $j$ for the purpose of effecting speed variations of the receiving shaft over a range of 100 to 900 revolutions per minute; or in the ratio of 1 to 9, without requiring the rollers to be brought nearer the center at any time to a greater amount than is represented by one third of the radius. The limits of the speeds transmitted by the present system can be varied by changing the ratio of the distance from each roller to the axis of the plates in the two end positions of the roller.

The successive displacements of the two driving and receiving rollers $i$ $j$ may be effected by the use of the following arrangement.

Each of the rollers $i$ $j$ can be given a movement through the medium of forked levers $k$ $l$ movable about axes $k^1$ $l^1$; these two levers are operated by means of a single handle $m$ which turns about a center pin $n$ and carries two studs or rollers $o$ $o^1$ engaging respectively within a guide slot provided upon each of the forked levers $k$ $l$. Each of these slots comprises an operative portion $p$ $p^1$ and a circular portion employed for stoppage, $q$ $q^1$, which is concentric with the axis of rotation of the handle $m$.

Figure 2:
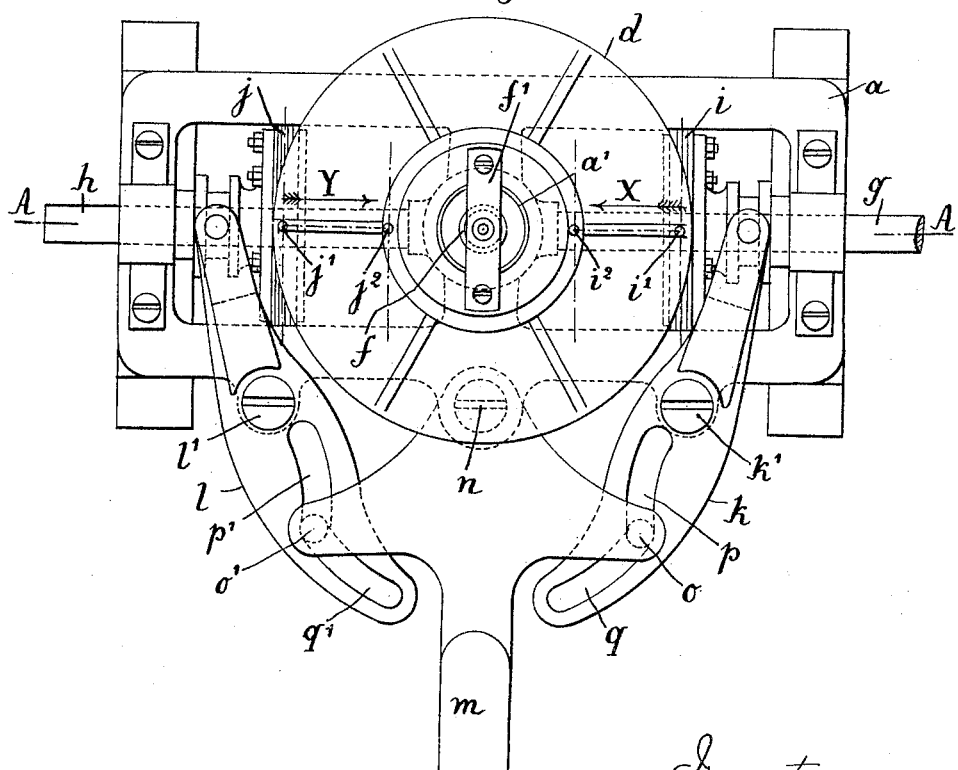
Fig. 2 is a plan view of the device.
Figure 3:
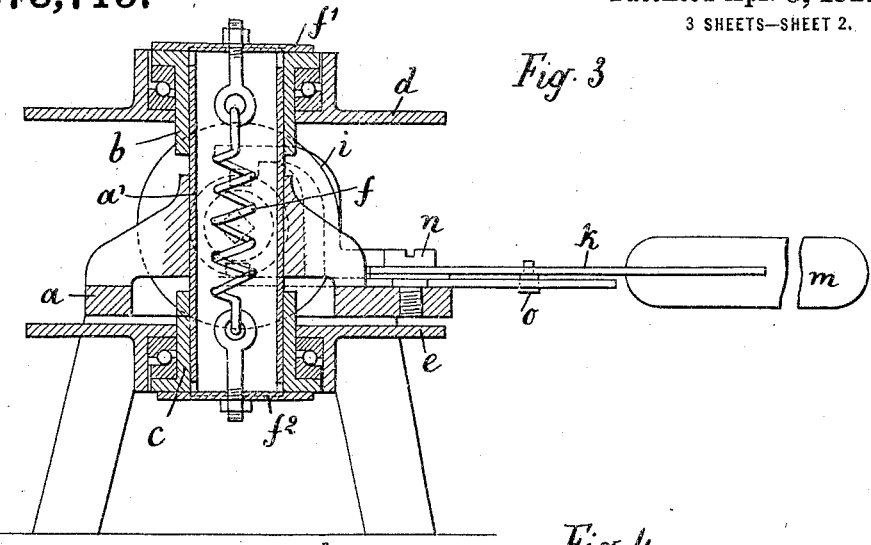
Fig. 3 is a vertical cross section along the line B—B of Fig. 1.

These two guide slots $p$ $p^1$ and $q$ $q^1$ are symmetrically disposed in such manner that the two rollers $i$ $j$ shall be situated at the periphery of the two intermediate plates $d$ $c$ and at an equal distance from the axis of the latter, when the handle $m$ shall occupy its middle position as shown in Fig. 2. In this case, the speed transmitted to the receiving shaft is equal to that of the driving shaft.

Upon displacing the handle $m$ to the right (Fig. 4) the stud $o$ will act upon the operative portion $p$ of the slot of the fork lever $k$ causing the latter to draw with it the roller $i$ in the direction of the arrow X, as shown in Fig. 2, toward the axis of the plates. On the contrary the stud $o^1$ will engage within the circular portion $q^1$ of the fork lever $l$ and will thus prevent the latter from moving while the second lever $k$ is being displaced.

If on the contrary the handle $m$ is displaced in the opposite direction (Fig. 5) the stud $o^1$ will act upon the operative portion $p^1$ of the slot of the fork lever $l$ and this latter will draw the roller $j$ in the direction of the arrow Y, as shown in Fig. 2, toward the axis of the plates; while on the contrary the stud $o$ will move within the circular part $q$ $p^1$ of the slot in the fork lever $k$, whereupon the roller $i$ will be maintained in its extreme position $i^1$.

In consequence of this arrangement, the device will afford a speed reduction or an increased speed ratio according to the right or left hand displacement of the handle $m$.

It is understood that the above described embodiment of the invention is given only by way of example, and that the form, the dimensions and the details of construction of the present change speed gear may be modified in any suitable manner according to the exigencies of the case.

For instance, in order to properly operate the friction rollers it may be advisable to provide suitable grooves or slots upon the movable plate which is integral with the operating handle, and to mount the rollers $o$ upon the arm which forms part of the forked member.

In order to take off or to reduce the friction of the rollers upon the plates during the time when the speed is being changed, the present apparatus can be provided with a device controlled by the operating handle and disposed in such manner as to separate the two plates from the rollers during the time that the change of speed is being effected. This device can also be employed as an uncoupling clutch.

Having now described my invention, what I claim and desire to secure by Letters Patent is:—

1. A change speed system containing in combination a driving shaft and a receiving shaft, two friction rollers keyed respectively upon the shafts, means for displacing the rollers along said shafts, a main body or frame, a hollow column supported by said frame, two sleeves sliding upon the column, friction plates mounted in ball bearings upon sleeves, and a retractile spring disposed within the column and tending to draw the sleeves together.

2. A change speed system containing, in combination, a main body or frame, a driving shaft and a receiving shaft, a hollow column attached to the frame, two thrust bearings formed in the column to receive the respective ends of the shafts, two friction rollers keyed respectively upon said shafts, means for displacing the rollers along said shafts, two sleeves adapted to slide upon said hollow column, friction plates mounted in ball bearings upon the sleeves, and a spring disposed within the column for the purpose of drawing said sleeves together.

3. A change speed system containing, in combination a driving shaft and a receiving shaft, two friction rollers keyed respectively upon the shafts, two forked levers for displacing the rollers, a guide slot formed upon each of said forked levers, an operating handle provided with studs engaging in said slots, two oppositely situated and loosely mounted friction plates engaging said rollers, and means for drawing the friction plates together.

In testimony that I claim the foregoing as my invention, I have signed my name.

CHARLES AMÉDÉE CAMBAY.